(12) United States Patent
Nishimura et al.

(10) Patent No.: US 7,035,016 B2
(45) Date of Patent: Apr. 25, 2006

(54) TIP OPTICAL ELEMENT FOR IMMERSION MICROSCOPE OBJECTIVES

(75) Inventors: Osamu Nishimura, Tokyo (JP); Takeshi Ikegami, Tokyo (JP)

(73) Assignee: Olympus Corporation, Tokyo (JP)

( * ) Notice: Subject to any disclaimer, the term of this patent is extended or adjusted under 35 U.S.C. 154(b) by 192 days.

(21) Appl. No.: 10/688,382

(22) Filed: Oct. 17, 2003

(65) Prior Publication Data

US 2004/0085626 A1 May 6, 2004

(30) Foreign Application Priority Data

Nov. 1, 2002 (JP) .............................. 2002-319457

(51) Int. Cl.
*G02B 21/02* (2006.01)
(52) U.S. Cl. ........................ 359/661; 359/656; 359/740
(58) Field of Classification Search ........ 359/656–661, 359/738–740, 741, 796, 793–795
See application file for complete search history.

(56) References Cited

U.S. PATENT DOCUMENTS 4,354,734 A * 10/1982 Nakahashi .................. 385/117
5,995,295 A * 11/1999 Nagaoka ..................... 359/654
5,999,327 A * 12/1999 Nagaoka ..................... 359/654
6,134,056 A * 10/2000 Nakamuka .................. 359/784

FOREIGN PATENT DOCUMENTS

JP         4-46416 U      4/1992

\* cited by examiner

*Primary Examiner*—Jordan M. Schwartz
(74) *Attorney, Agent, or Firm*—Frishauf, Holtz, Goodman & Chick, P.C.

(57) ABSTRACT

A tip optical element for immersion microscope objectives is constructed so that a first optical element and a second optical element are cemented to each other, and has an annular light-blocking area on a surface of one of the first optical element and the second optical element to be cemented. The tip optical element is fabricated in such a way that a beam restricting device is placed on a surface of one of the first optical element and the second optical element; a light-transmitting area transmitting an effective beam and the light-blocking area formed around the light-transmitting area are provided to the beam restricting device; and the first optical element and the second optical element are cemented to each other, with the beam restricting device sandwiched between them.

11 Claims, 6 Drawing Sheets

TIP OPTICAL ELEMENT FOR IMMERSION MICROSCOPE OBJECTIVES

BACKGROUND OF THE INVENTION

1. Field of the Invention

This invention relates to an improvement on a tip optical element for immersion objectives of a high resolving power, used in a microscope.

2. Description of Related Art

In order to obtain a high resolving power and a high magnification, immersion objectives have been used in such a way that space between a specimen and a front lens (a tip optical element) of a microscope objective is charged with a liquid, such as water or oil, which has a higher refractive index than in air. In the front lens, a hemispherical or nearly hemispherical lens is used, and in order to improve correction for aberration, a minute lens which is different in dispersion or refractive index from the front lens is often embedded in the middle portion of the tip of the lens (refer to FIG. 2 of Japanese Utility Model Kokai No. Hei 4-46416, for instance).

Figure 1:
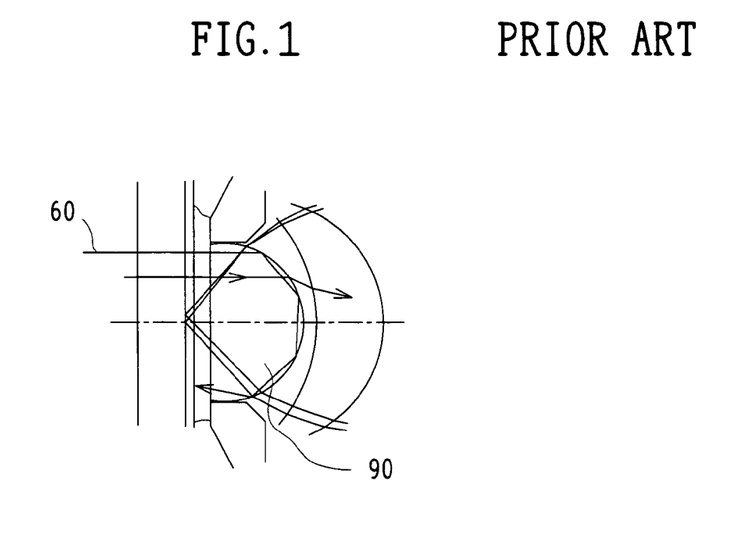
FIG. 1 is a view showing schematically a state where detrimental light is incident from outside the effective diameter of a conventional front lens to produce flare.
Figure 2:
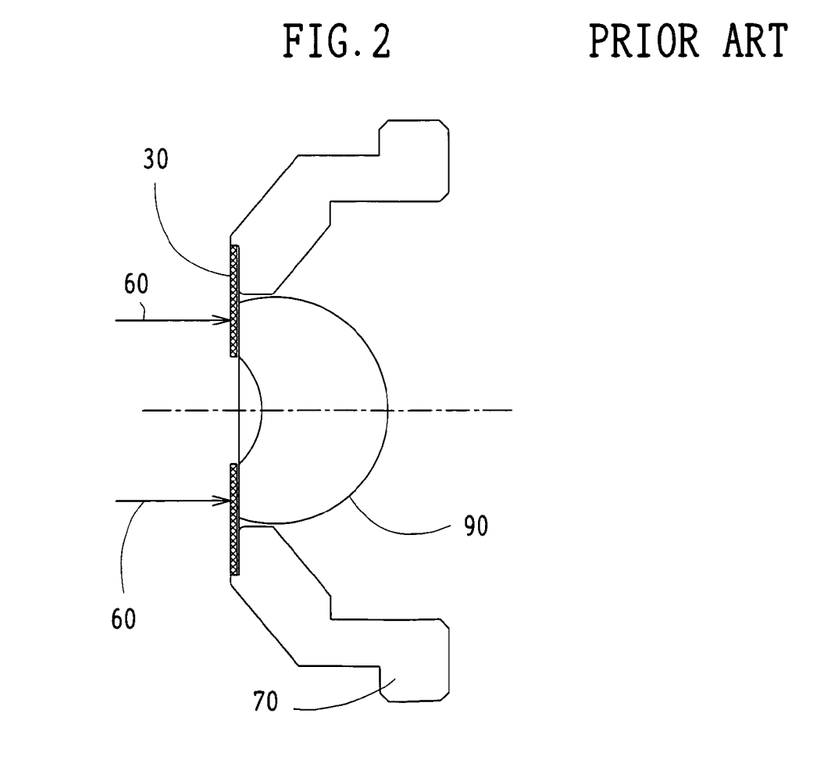
FIG. 2 is a sectional view showing schematically a method of cementing a stop to the lens holding frame of the conventional front lens to block a detrimental beam.
Figure 3:
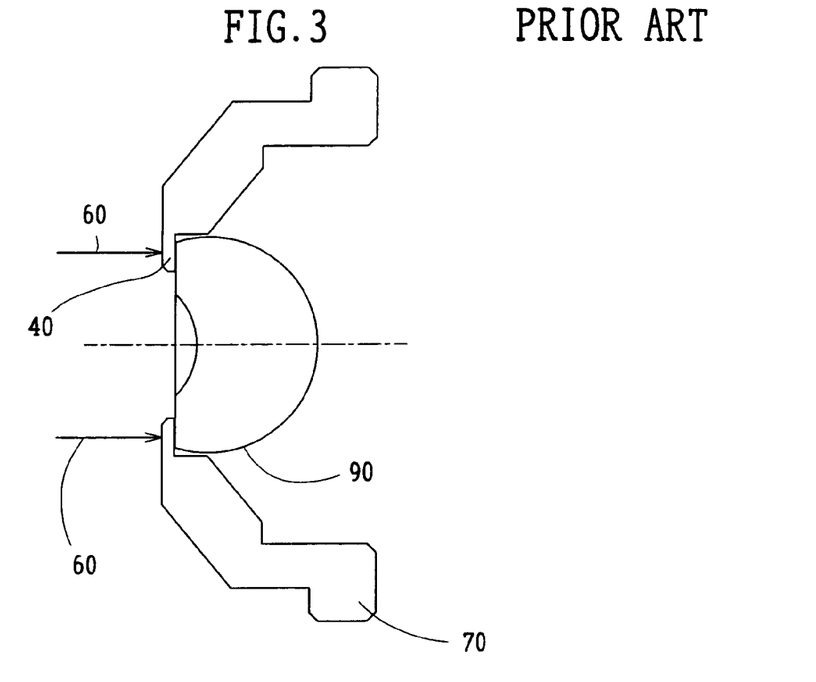
FIG. 3 is a sectional view showing schematically a method of providing a flange to the lens holding frame of the conventional front lens to block the detrimental beam.
Figure 4:
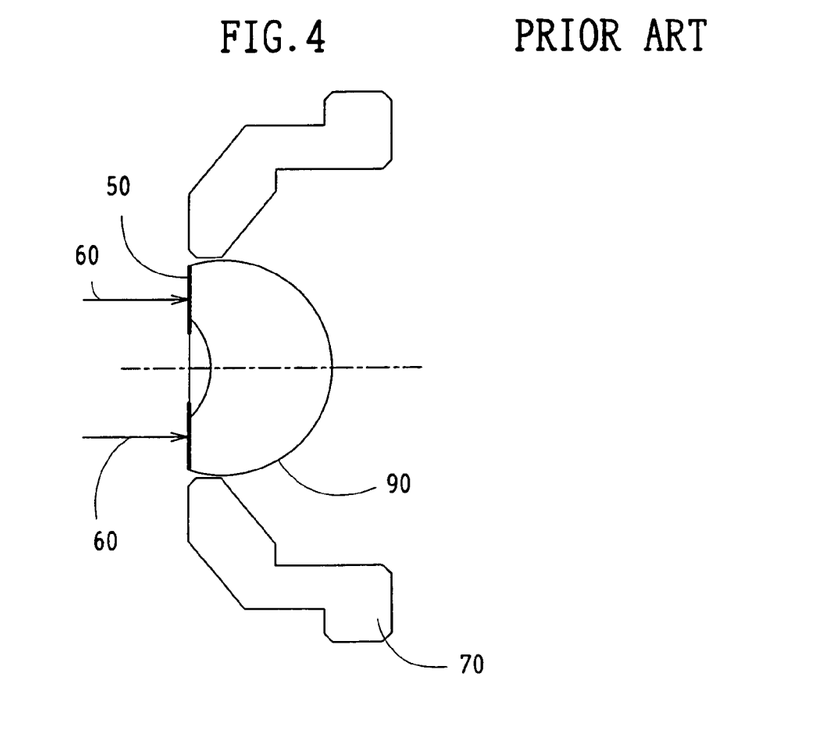
FIG. 4 is a view showing schematically a method of evaporating a metal film on the surface of the conventional front lens to block the detrimental beam.

An objective using such a front lens, as shown in FIG. 1 (corresponding to FIG. 5 of the above publication), has the problem that a detrimental ray of light 60 is incident on the front lens 90 from outside the effective diameter thereof to produce flare. In order to solve this problem, some methods of blocking the detrimental ray 60 incident from outside the effective diameter of the front lens 90 have been proposed. For example, there are, as shown in FIG. 2, a method of cementing a stop 30 to a frame 70 holding the front lens 90 to block the detrimental ray 60; as in FIG. 3, a method of providing a flange 40 to the lens holding frame 70 and holding the front lens 90 by caulking or cementation to block the detrimental ray 60 with this flange 40; and as in FIG. 4, a method of evaporating a metal film 50 outside the effective diameter of a beam of light on the surface of the front lens 90 to block the detrimental ray 60.

Figure 5A:
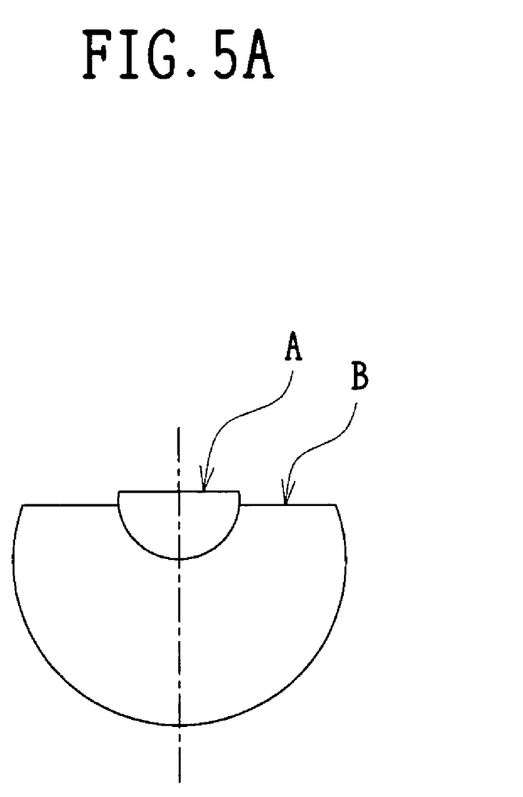
FIGS. 5A and 5B are explanatory views showing states of the end surface of a minute lens and the end surface of a lens in which the minute lens is embedded.
Figure 5B:
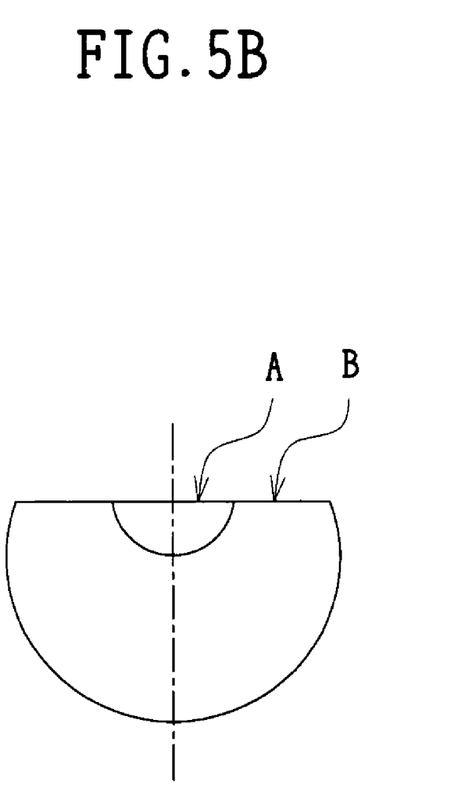

In the evaporation of metal film 50, the lens must be treated at temperatures of 200–300° C. When the minute lens is embedded in and cemented to the front lens 90, the embedded lens sometimes comes loose due to such high temperatures. Usually, the minute lens, after being embedded (see FIG. 5A), is ground so that an end surface A of the minute lens is flush with an end surface B of the lens in which the minute lens is embedded (see FIG. 5B). This is because if there is a step on the surface of the tip of the objective, air bubbles will easily enter into oil or water with which the space between the tip of the objective and the specimen is charged. Consequently, it is not proper that the metal film 50 is evaporated before the minute lens is embedded.

SUMMARY OF THE INVENTION

The tip optical element for immersion microscope objectives according to the present invention includes a first optical element and a second optical element, cemented to each other, and has an annular light-blocking area on an interface between them.

Further, the tip optical element for immersion microscope objectives according to the present invention includes a first optical element and a second optical element. In this case, a light-blocking area is provided on a surface of one of the first optical element and the second optical element so that an effective light beam is not blocked, and the first optical element and the second optical element are cemented to each other, with the surface on which the light-blocking area is formed, sandwiched between them.

Still further, the tip optical element for immersion microscope objectives according to the present invention includes a first optical element, a second optical element, and a third optical element. In this case, a light-blocking area is provided on a surface of one of the first optical element and the second optical element so that an effective light beam is not blocked, and the first optical element and the second optical element are cemented to each other, with the surface on which the light-blocking area is formed, sandwiched between them. In addition, the third optical element is embedded at the center of the first optical element and the second optical element.

These and other features and advantages of the present invention will become apparent from the following detailed description of the preferred embodiments when taken in conjunction with the accompanying drawings.

DETAILED DESCRIPTION OF THE PREFERRED EMBODIMENTS

In accordance with the embodiments shown in the drawings, the present invention will be described below. Before undertaking the description of the embodiment, the function and effect of the present invention will be explained.

According to the present invention, the detrimental beam can be blocked, without cementing the stop to the lens frame or providing the flange to the lens frame, and thus a sufficient space can be ensured between the objective and the specimen. Furthermore, since a member used for the light-blocking area does not come in direct contact with a solution like water or oil, a metal evaporation substance, paint, or metal leaf can be used without restriction. For example, the metal evaporation substance is used when the position accuracy of the light-blocking area is improved, the paint is used when various colors are employed at low cost, and the metal leaf is used when the process of cementation with optical elements or the formation of the light-blocking area is facilitated. In this way, materials can be selected in accordance with applications and requirements.

The member used for the light-blocking area, which does not come in contact with the solution, has no adverse effect on water, oil, or the specimen. Since the light-blocking area is located inside the front lens which is the tip optical element, no change occurs in the light-blocking area even though the operation that the solution, such as water or oil, on the surface of the tip of the objective is wiped off is repeated many times after microscopy.

In particular, according to the present invention, a front lens in which correction of aberration is improved can brought about the same function and effect as in the above description.

The present invention proposes the method of making the front lens of the immersion microscope objective, that is, the method of making the front lens in such a way that the light-blocking area is provided on one of the first optical element and the second optical element which constitute the front lens so that an effective light beam is not blocked, and the first optical element and the second optical element are cemented to each other, with the surface on which the light-blocking area is formed, sandwiched between them. When this method is used, the front lens provided with the above function and effect can be fabricated.

Further, the present invention proposes the method of making the lens of the type that a minute lens which is different in dispersion or refractive index from the front lens is embedded in the middle portion of the tip of the front lens in order to improve correction of aberration with the immersion objective, that is, the method of making the front lens in such a way that the light-blocking area is provided on the entire surface of one of the first optical element and the second optical element which constitute the front lens; the first optical element and the second optical element are cemented to each other, with the surface on which the light-blocking area is formed, sandwiched between them; a concave potion is formed at the center in this state of cementation; and the third optical element is embedded in the concave portion. When this method is used, the front lens provided with the above function and effect can be fabricated. In this case, even though the light-blocking area such that an effective beam is ensured is not formed in the first optical element or the second optical element, an effective beam area is formed when the concave portion for embedding the third optical element is provided, and thus the high efficiency of fabrication becomes possible. The third optical element is embedded and cemented after the formation of the light-blocking area, and hence even when the light-blocking area is formed by evaporation, thermal loose of the third optical element embedded and cemented is not caused.

First Embodiment

Figure 6A:
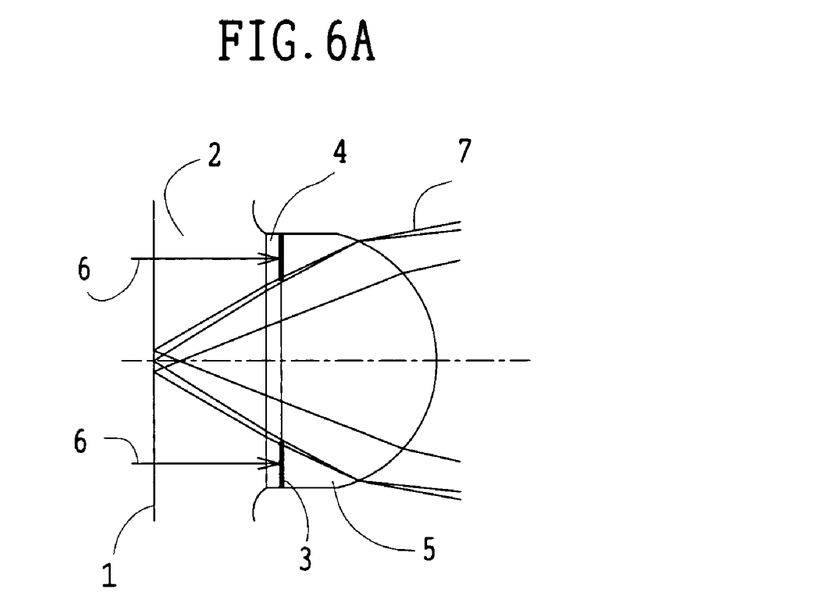
FIG. 6A is a view showing schematically a state of incidence of rays of light on a front lens in a first embodiment of the tip optical element for immersion microscope objectives according to the present invention.
Figure 6B:
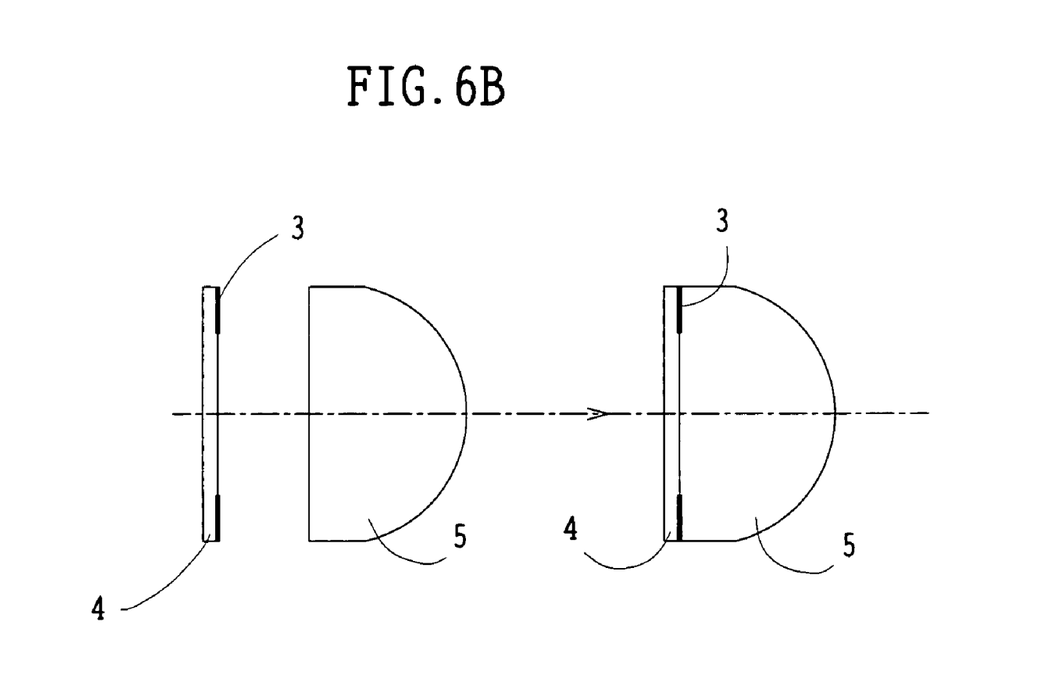
FIG. 6B is an explanatory view showing a method of forming the front lens in the first embodiment.

FIGS. 6A and 6B show the first embodiment of the tip optical element (the front lens) for immersion microscope objectives according to the present invention. In these figures, reference numeral 1 represents a specimen, 2 represents a medium such as oil or water, and 3 represents a metal film which is a stop provided between a plane-parallel optical element 4 and an optical element 5 which are cemented to each other. The metal film 3, the plane-parallel optical element 4, and the optical element 5 constitute the front lens. A light beam from the specimen 1 is such that a detrimental beam 6 is blocked by the stop consisting of the metal film 3 and only an effective beam 7 can be passed through the front lens.

The metal film 3 is made of chromium oxide or titanium oxide, and as shown in FIG. 6A, is annularly evaporated in vacuum on the surface, on the side of the optical element 5, of the plane-parallel optical element 4 so that the effective beam incident on the surface of the optical element 5 to be cemented is not blocked. After that, the plane-parallel optical element 4 is cemented to the optical element 5 with the metal film 3 sandwiched between them. In this way, the front lens is formed. The metal film 3 may be evaporated not on the surface of the plane-parallel optical element 4, but on the surface of the optical element 5 to be cemented.

When the front lens formed as mentioned above is incorporated in the lens frame, the detrimental light is now blocked without cementing the stop to the lens frame or providing the flange to the lens frame as in the conventional method. Thus, a sufficient space can be ensured between the tip of the front lens and the specimen 1 and there is no loss in a working distance (a distance from the specimen to the tip of the objective). Moreover, since the stop of the metal film is formed inside the front lens, the degradation of the metal film is not caused and there is no problem of durability thereof.

Second Embodiment

Figure 7A:
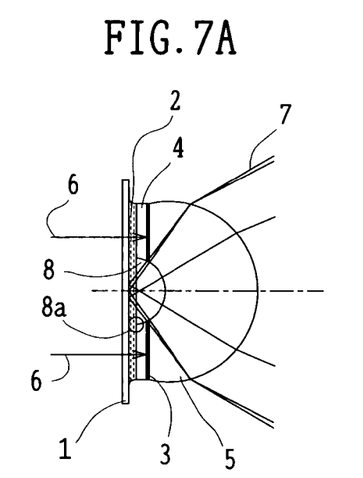
FIG. 7A is a view showing schematically a state of incidence of rays of light on a front lens in a second embodiment of the tip optical element for immersion microscope objectives according to the present invention.
Figure 7B:
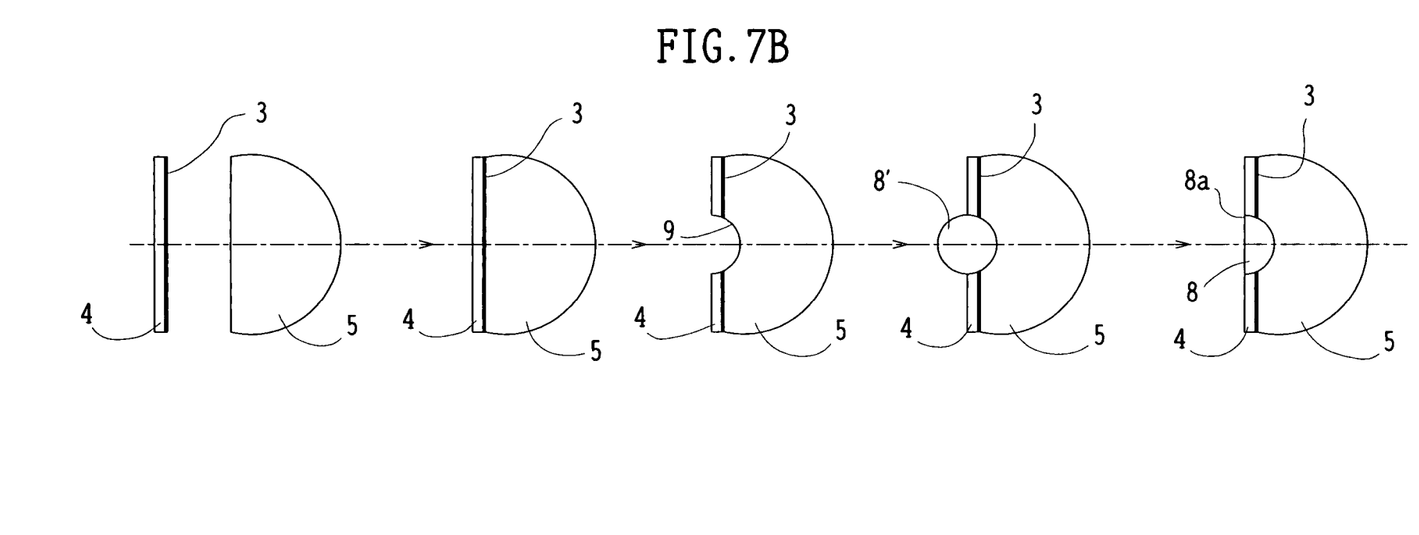
FIG. 7B is an explanatory view showing a method of forming the front lens in the second embodiment.

FIGS. 7A and 7B show the second embodiment of the tip optical element (the front lens) for immersion microscope objectives according to the present invention. In these figures, like numerals are used for practically like members with respect to the first embodiment and their explanation is omitted.

In order to improve correction for aberration, the second embodiment is constructed so that a minute lens 8 which is different in dispersion or refractive index from the front lens is embedded in the middle portion of the tip of the front lens. A light beam from the specimen 1, as shown in FIG. 7A, is such that the detrimental rays 6 are blocked by the stop consisting of the metal film 3 provided between the plane-parallel optical element 4 and the optical element 5 which are cemented to each other, and only the effective beam 7 can be transmitted through the front lens.

The front lens of this type is formed by the following procedure. As shown in FIG. 7B, the metal film 3 made by chromium oxide or titanium oxide is first evaporated in vacuum on the whole of the surface of the plane-parallel optical element 4 to be cemented to the optical element 5, and the optical element 5 is cemented to the plane-parallel optical element 4, with the metal film sandwiched between them. Then, a concave portion 9 for embedding the minute lens 8 is worked at the center, from the plane-parallel optical element 4 toward the optical element 5, and a lens 8' to be worked is embedded in and cemented to the concave portion 9. After that, an unnecessary part of the lens 8' is cut and its surface is ground to eliminate a step. Also, the metal film 3 may be formed not on the surface of the plane-parallel optical element 4, but on the surface of the optical element 5 to be cemented.

In this fabrication method, since the embedding lens 8' can be held by the metal film 3 to the utmost possible limit of its effective diameter, the detrimental beam 6 can be blocked more effectively than in the conventional method of cementing the stop to the lens frame or providing the flange to the lens frame. Furthermore, the beam can be restricted behind an edge 8a of the embedded lens 8, and thus there is no fear that flare is produced by confusion light. In addition, since as in the first embodiment a sufficient space can be ensured between the tip of the front lens and the specimen 1, there is no loss in the working distance. Since the stop of the metal film is formed inside the front lens, the degradation of the metal film is not caused and there is no problem of durability thereof.

Figure 8:
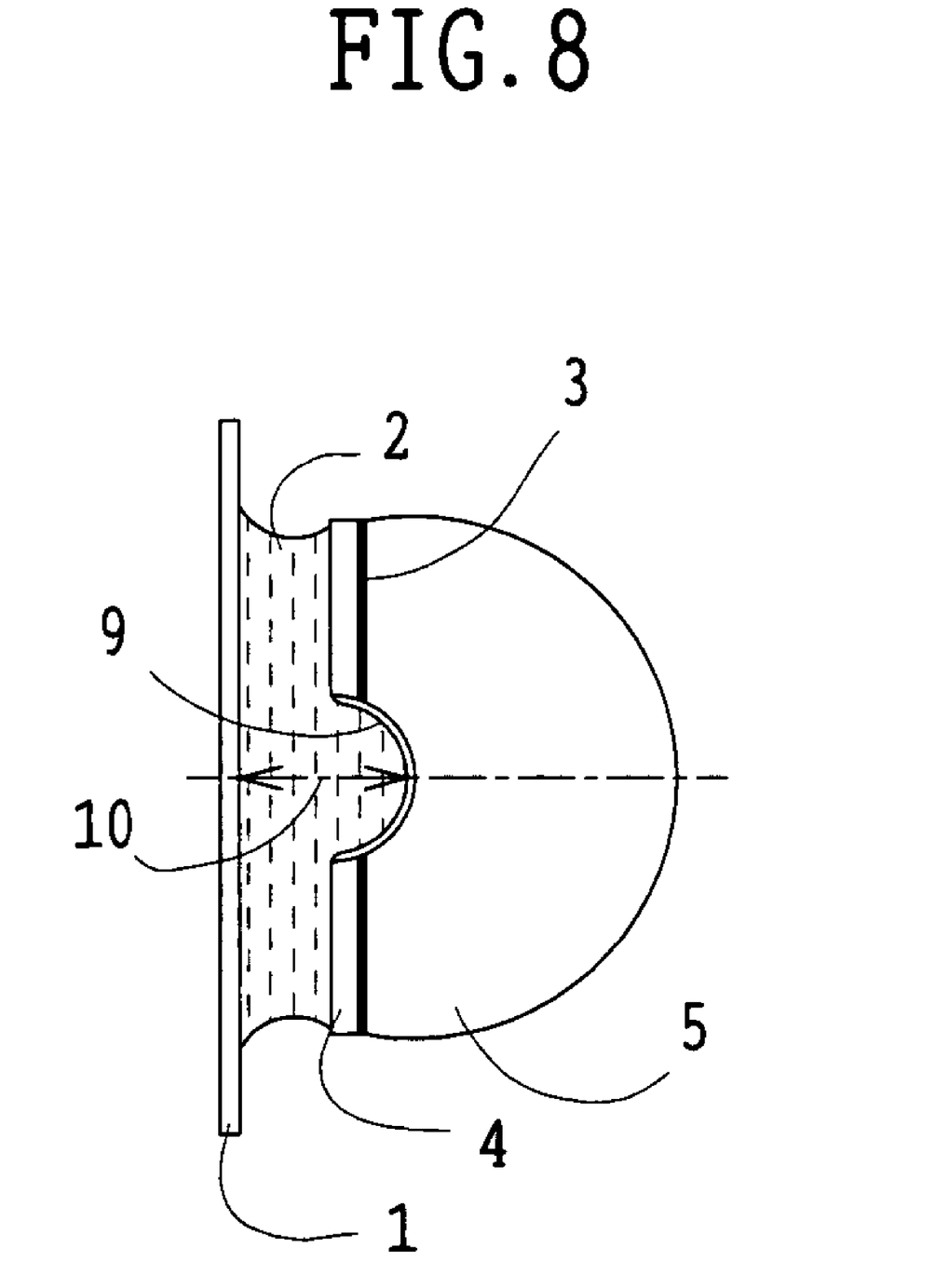
FIG. 8 is a sectional view showing a modified example where a concave portion is formed at the center of the front lens of the tip optical element for immersion microscope objectives according to the present invention.

Also, although it is described in the first and second embodiments that the light-blocking area annularly formed is constructed with the metal film, paint or metal leaf may be applied to the light-blocking area. In the second embodiment, without embedding the minute lens 8, the concave portion 9, as shown in FIG. 8, can also be used as it is. This is because the concave portion 9 is charged with the solution, such as oil or water, and thereby a lens can be formed instead of the minute lens 8. In this case, the front lens can be fabricated at a lower cost.

What is claimed is:

1. A tip optical element unit for an immersion microscope objective for observing a sample, said tip optical element unit comprising:
    a first optical element;
    a second optical element cemented to the first optical element; and
    an annular light-blocking area provided at an interface between the first optical element and the second optical elements;
    wherein, among optical elements within the objective, the first and second optical elements are closest to the sample; and
    wherein a gap between the sample and the first optical element is filled with liquid having a refractive index larger than air.

2. A tip optical element unit for an immersion microscope objective for observing a sample, said tip optical element unit comprising:
    a first optical element:
    a second optical element; and
    a light-blocking area which is formed on a surface of one of the first optical element and the second optical element, and which is shaped so as to avoid blocking an effective beams;
    wherein the first optical element and the second optical element are cemented to each other, and the surface on which the light-blocking area is formed is sandwiched between the first optical element and the second optical elements;
    wherein, among optical elements within the objective, the first and second optical elements are closest to the sample; and
    wherein a gap between the sample and the first optical element is filled with liquid having a refractive index larger than air.

3. A tip optical element unit for an immersion microscope objective for observing a sample, said tip optical element unit comprising:
    a first optical element;
    a second optical element;
    a third optical element; and
    a light-blocking area which is formed on a surface of one of the first optical element and the second optical element, and which is shaped so as to avoid blocking an effective beam;
    wherein the first optical element and the second optical element are cemented to each other, and the surface on which the light-blocking area is formed is sandwiched between the first optical element and the second optical element;
    wherein the third optical element is embedded at a center of the first optical element and the second optical element; and
    wherein, among optical elements within the objective, the first, second and third optical elements are closest to the sample.

4. The tip optical element unit according to claim 1, wherein a concave portion is formed at a center of the first optical element and the second optical element.

5. The tip optical element unit according to claim 1, wherein the light-blocking area is formed of one of an evaporated metal film, a painted material, and a metal leaf.

6. The tip optical element unit according to claim 3, wherein the third optical element is smaller in size than both the first optical element and the second optical element and is different in dispersion and refractive index from the first optical element and the second optical element.

7. A method of making a tip optical element unit for an immersion microscope objective for observing a sample, said method comprising:
    placing a beam restricting element on a surface of one of a first optical element and a second optical element and defining a light-transmitting area which transmits an effective beam and a light-blocking area formed around the light-transmitting area with the beam restricting element; and
    cementing the first optical element and the second optical element to each other such that the beam restricting element is sandwiched between the first optical element and the second optical element;
    wherein, among optical elements within the objective, the first and second optical elements are closest to the sample; and
    wherein a gap between the sample and the first optical element is filled with liquid having a refractive index larger than air.

8. A method of making a tip optical element unit for an immersion microscope objective for observing a sample, said method comprising:
    forming a light-blocking area on a surface of one of a first optical element and a second optical element, said light-blocking area being shaped so as to avoid blocking an effective beam;
    cementing the first optical element and the second optical element to each other such that the light-blocking area is sandwiched between the first optical element and the second optical element;
    forming a concave portion at a center of the first optical element and the second optical element; and
    embedding a third optical element in the concave portions;
    wherein, among optical elements within the objective, the first, second and third optical elements are closest to the sample.

9. The tip optical element unit according to claim 2, wherein the light-blocking area is formed of one of an evaporated metal film, a painted material, and a metal leaf.

10. The tip optical element unit according to claim 3, wherein the light-blocking area is formed of one of an evaporated metal film, a painted material, and a metal leaf.

11. The tip optical element unit according to claim 4, wherein the light-blocking area is formed of one of an evaporated metal film, a painted material, and a metal leaf.

* * * * *

UNITED STATES PATENT AND TRADEMARK OFFICE
CERTIFICATE OF CORRECTION

| | |
|---|---|
| PATENT NO. | : 7,035,016 B2 |
| APPLICATION NO. | : 10/688382 |
| DATED | : April 25, 2006 |
| INVENTOR(S) | : Osamu Nishimura et al. |

It is certified that error appears in the above-identified patent and that said Letters Patent is hereby corrected as shown below:

Column 5, Lines 16-17 (claim 1, lines 8-9), change "second optical elements"

to --second optical element-- .

Column 5, Line 32 (claim 2, line 9), change "effective beams"

to --effective beam-- .

Column 5, lines 36-37 (claim 2, lines 13-14), change "second optical elements"

to --second optical element-- .

Column 6, lines 44-45 (claim 8, lines 14-15), change "concave portions"

to --concave portion-- .

Signed and Sealed this

Thirteenth Day of March, 2007

JON W. DUDAS
*Director of the United States Patent and Trademark Office*